United States Patent
Gamer et al.

(10) Patent No.: US 10,270,747 B2
(45) Date of Patent: *Apr. 23, 2019

(54) METHODS AND DEVICES HAVING A KEY DISTRIBUTOR FUNCTION FOR IMPROVING THE SPEED AND QUALITY OF A HANDOVER

(71) Applicant: Unify GmbH & Co. KG, Munich (DE)

(72) Inventors: Thomas Gamer, Oftersheim (DE); Matthias Roth, Kuppenheim (DE); Michael Bahr, Munich (DE); Christian Schwingenschlogl, Putzbrunn (DE)

(73) Assignee: Unify GmbH & Co. KG, Munich (DE)

( * ) Notice: Subject to any disclaimer, the term of this patent is extended or adjusted under 35 U.S.C. 154(b) by 30 days.

This patent is subject to a terminal disclaimer.

(21) Appl. No.: 15/660,098

(22) Filed: Jul. 26, 2017

(65) Prior Publication Data

US 2017/0324718 A1 Nov. 9, 2017

Related U.S. Application Data

(63) Continuation of application No. 14/858,018, filed on Sep. 18, 2015, now Pat. No. 9,860,220, which is a
(Continued)

(51) Int. Cl.
*H04W 12/04* (2009.01)
*H04L 29/06* (2006.01)
(Continued)

(52) U.S. Cl.
CPC ............ *H04L 63/062* (2013.01); *H04L 9/083* (2013.01); *H04W 12/04* (2013.01);
(Continued)

(58) Field of Classification Search
CPC ... H04L 2209/80; H04L 63/062; H04L 9/083; H04W 12/04; H04W 12/06; H04W 36/0016

See application file for complete search history.

(56) References Cited

U.S. PATENT DOCUMENTS 7,707,415 B2 * 4/2010 Braskich ............ H04L 63/0892
                                              380/270
9,860,220 B2 * 1/2018 Gamer .................... H04L 9/083
(Continued)

FOREIGN PATENT DOCUMENTS

CN          101079705 A     11/2007
CN          101163013 A      4/2008
(Continued)

OTHER PUBLICATIONS

International Preliminary Report on Patentability for PCT/EP2011/001934 dated Oct. 30, 2012 (German Translation).
(Continued)

*Primary Examiner* — Mohamed A Kamara
(74) *Attorney, Agent, or Firm* — Buchanan Ingersoll & Rooney PC

(57) ABSTRACT

A key distributer node for a network includes a memory device with at least one first key, at least one data communication device that can exchange data with first and second access nodes for a terminal integrated wirelessly into the network, at least one processor connected to the memory device and the data communication device, wherein functions are provided for the processor(s) that allow authentication of the terminal at the second access node in response to a key request received by the second access node, a derivation of a second key from the first key, and triggered transmission of the second key through the data communication device to the second access node. Connections to the network's first and second access nodes with security relationships can be provided for the key distributor node when using the first key.

20 Claims, 4 Drawing Sheets

Related U.S. Application Data continuation of application No. 13/498,029, filed as application No. PCT/EP2011/001934 on Apr. 15, 2011, now abandoned.

(51) Int. Cl.
*H04L 9/08* (2006.01)
*H04W 36/00* (2009.01)
*H04W 12/06* (2009.01)

(52) U.S. Cl.
CPC ..... *H04W 36/0016* (2013.01); *H04L 2209/80* (2013.01); *H04W 12/06* (2013.01)

(56) References Cited

U.S. PATENT DOCUMENTS

| | | | |
|---|---|---|---|
| 2004/0199789 A1 | 10/2004 | Shaw et al. | |
| 2007/0110009 A1 | 5/2007 | Bachmann et al. | |
| 2007/0121947 A1 | 5/2007 | Sood et al. | |
| 2007/0250713 A1 | 10/2007 | Rahman et al. | |
| 2008/0065884 A1* | 3/2008 | Emeott | H04L 9/0836 713/168 |
| 2008/0070577 A1 | 3/2008 | Narayanan et al. | |
| 2008/0137853 A1* | 6/2008 | Mizikovsky | H04L 9/0836 380/247 |
| 2008/0316988 A1 | 12/2008 | Lee et al. | |
| 2009/0116647 A1 | 5/2009 | Korus et al. | |
| 2009/0170476 A1 | 7/2009 | Lin et al. | |
| 2009/0210699 A1* | 8/2009 | Grewal | H04L 9/083 713/155 |
| 2009/0210710 A1* | 8/2009 | Zheng | H04L 9/0844 713/171 |
| 2010/0211790 A1 | 8/2010 | Zhang | |
| 2010/0257364 A1 | 10/2010 | Baek et al. | |

FOREIGN PATENT DOCUMENTS

| | | |
|---|---|---|
| EP | 1439667 A2 | 7/2004 |
| EP | 2288194 A1 | 2/2011 |
| WO | 2009154277 A1 | 12/2009 |

OTHER PUBLICATIONS

International Preliminary Report on Patentability for PCT/EP2011/001934 dated Oct. 30, 2012 (English Translation).

International Search Report for PCT/EP2011/001934 dated Aug. 4, 2011 (German Translation).

International Search Report for PCT/EP2011/001934 dated Aug. 4, 2011 (English Translation).

Written Opinion of the International Searching Authority for PCT/EP2011/001934 dated Aug. 4, 2011 (German Translation).

IEEE Standard for Local and Metropolitan Are Networks 802.21; Part 21: Media Independent Handover Services; IEEE Computer Society; IEEE Std. 802.21-2008; Jan. 21, 2009; LAN/MAN Standards Committee.

IEEE Trial-Use Recommended Practice for Multi-Vendor Access Point Interoperability via an Inter-Access Point Protocol Across Distribution Systems Supporting IEEE 802.11 Operation; IEEE Standards 802.11F; IEEE Computer Society; Jul. 14, 2003; LAN/MAN Standards Committee.

Efficient Roaming Over Heterogeneous Wireless Networks; Hosame Abu-Amara; Jeongjoon Lee, Catherine Roseberg, and Edwin K. P. Chong; Telecommunications Engineering Program, University of Texas at Dallas; School of Electrical and Computer Engineering, Purdue University; and Dept. of Electrical and Computer Engineering, Colorado State University.

* cited by examiner

METHODS AND DEVICES HAVING A KEY DISTRIBUTOR FUNCTION FOR IMPROVING THE SPEED AND QUALITY OF A HANDOVER

CROSS-REFERENCE TO RELATED APPLICATIONS

This application is a continuation application of U.S. patent application Ser. No. 14/858,018, which claims priority to U.S. patent application Ser. No. 13/498,029, which is the United States national phase under 35 U.S.C. § 371 of PCT International Patent Application No. PCT/EP2011/001934, filed on Apr. 15, 2011, and claiming priority to German Application No. 10 2010 018 286.9, filed on Apr. 26, 2010.

BACKGROUND OF THE INVENTION

Field of the Invention

Embodiments are typically in the field of wireless networks.

Background of Related Art

Wireless networks are increasingly being used in homes and offices. Mesh networks are wireless networks with a flexible topology. Meshable nodes of a mesh network have features to detect topology changes or to establish fallback routes.

For the Internet, real-time applications such as Voice-over-IP (VoIP) or Video-on-Demand (VoD) are known. Endpoints of real-time communication are usually so-called "stations" or "clients", i.e., non-meshable terminals.

For integration into a mesh network, these terminals must be associated with access nodes of the mesh network. In response to topology changes in the mesh network or the movements of a terminal across multiple wireless cells of the mesh network's access nodes, handover procedures are provided in which the terminal associated with an access node newly associates with another access node of the mesh network.

The speed of the handover procedures for real-time applications is especially critical for the quality and feasibility of such real-time applications using wireless connections. To enable real-time capabilities for non-meshable terminals, the handover procedures from one access node to another should therefore occur with the least possible lag time and packet loss.

802.11 networks operate with fixed access nodes, which usually communicate with each other via wired connections.

In mesh networks, communication for key distribution between access nodes is less reliable than with wired communication, due to the wireless transmission, and experiences increased delays due to multi-hop communication. This results in slower handover procedures in mesh networks. Due to the mobility of both mesh nodes and terminals or stations, handover procedures also occur more frequently in mesh networks. The mobility of both mesh nodes and terminals can lead to an increased number of handover procedures. In mesh networks, access nodes operate error-prone communication via a wireless medium, which is typically also carried out across several wireless hops. Thus, a request of a PMK-R1 key through an access node with which a terminal must newly associate requires time, and the handover is delayed.

The IEEE 802.11F standard indicates handover mechanisms in 802.11 networks and is documented in IEEE Trial-Use Recommended Practice for Multi-Vendor Access Point Interoperability via an Inter-Access Point Protocol Across Distribution Systems Supporting IEEE 802.11 Operation, 2003. It does not include any mechanisms for optimizing a handover procedure.

The 802.21 standard concerns the communication and execution of a handover procedure between heterogeneous networks and is documented in Standard for Media Independent Handover Services, IEEE Computer Society/Local and Metropolitan Area Networks, Draft 802.21-Standard, 2004.

Bruce McMurdo, Cisco Fast Secure Roaming, 2004 demonstrates an acceleration of authentication after initiating a handover.

To speed up handover procedures, the utilization of several interfaces is demonstrated in Catherine Rosenberg, Edwin K. P. Chong, Hosame Abu-Amara, Jeongjoon Lee, Efficient Roaming over Heterogeneous Wireless Networks, Proceedings of WNCG Wireless Networking Symposium, 2003. To this end, authentication with the new access node is already carried out while the station is still connected to the old node via the second interface.

A standardization for fast handover procedures in wireless 802.11 networks is shown in Draft Amendment to Standard for Information Technology—Telecommunications and Information Exchange between Systems—LAN/MAN Specific Requirements—Part 11: Wireless LAN Medium Access Control (MAC) and Physical Layer (PHY) specifications: Amendment 2: Fast BSS Transition, D2.0, March 2006.

According to the IEEE 802.11r standard, a special key hierarchy is used in wireless 802.11 networks in order to optimize handover procedures. This standardized version of key distribution, in which a node is adapted as in the preamble in claim 1, is such that a security relationship with the PMK-R0 key holder must be requested first at the Mobility Domain Controller (MDC), before a PMK-R1 key can be transferred for the handover procedure. This delays the handover procedure.

FIG. 2 schematically illustrates communication in a handover procedure according to the IEEE 802.11r standard.

After its initial registration, each access node calculates a PMK-R0 key within a mobility domain. Using a mobility domain controller MDC, it establishes a security relationship with a PMK-R0 key holder. After successful authentication, said key holder is derived from the negotiated master key and is stored on the access node MAP1, where the new access node MAP2 logs on for the first time. This access node MAP1 is also referred to as PMK-R0 key holder. Then, a so-called PMK-R1 key, which forms the basis for protecting the communication between access nodes and a terminal STA, is derived from the PMK-R0 key.

The new meshable access node MAP2 receives an authentication request from the terminal STA, which initiates the handover procedure. If the terminal STA initiates a handover procedure in a step S1, then the new access node MAP2 establishes a security relationship with the access node MAP1, which is the PMK-R0 key holder, in a step S0 using the mobility domain controller MDC. There, in a step S2', it requests its "own" PMK-R1 key, which serves as the basis for the protection of the new communication relationship between the terminal STA and the new access node MAP2. To this end, in a step S3' the access node MAP1 derives the PMK-R1 key from the PMK-R0 key, and in a step S4' it transmits the PMK-R1 key to the new access node MAP2. The new access node MAP2 then transmits an authentication response to the terminal in a step S5', whereupon the terminal associates with the new access node MAP2 in a step S6 such that the handover procedure can be concluded successfully without renewed authentication of the terminal.

BRIEF SUMMARY OF THE INVENTION

Although doing so is not required by the claims unless stated therein, we desire to improve the speed and/or quality of a handover procedure between a first and a second or new access node for a terminal that is integrated wirelessly into the network, and to simplify that handover procedure.

To this end, embodiments of the invention concern a key distributer node for a mesh network, which comprises:
 a) a memory device having at least one first key derived from a master key for all terminals to be incorporated into the mesh network,
 b) at least one data communication device that can exchange data with first and second access nodes for a terminal integrated wirelessly into the mesh network,
 c) at least one processor connected to the memory device and the data communication device,
wherein functions are provided for the processor(s) that allow authentication of the terminal at the second access node in response to a received key request from the second access node,
 d) a second key, to be derived from the first key stored in the memory device, and
 e) triggered transmission of the second key through the data communication device to the second access node.

According to an embodiment of the invention, the key distributor node has connections to the mesh network's first and second access nodes with security relationships that are already established when the key request is received by the second access node when using the first key.

BRIEF DESCRIPTION OF THE FIGURES

Aspects and an exemplary embodiment of the invention are described below with reference to the figures, in which.

LIST OF REFERENCE NUMBERS

1 Memory device
2 Data communications device
3 Processor
4 BUS
AS Authentication server
STA Terminal
MAP1 First access node
MAP2 Second access node
MDC Mobility domain controller

DETAILED DESCRIPTION OF THE INVENTION

Embodiments of the invention concern a key distributor node for a network, which is connected to first and second access nodes in the network for a terminal device that is integrated wirelessly into the network. Embodiments also relate to a combination of that node and the first and second access nodes. Embodiments further concern a network comprising this combination and the terminal device. Embodiments may relate a method for authenticating the terminal device in the network and a computer program with features for implementing the method. Embodiments can be used in a Voice-over-IP application and a Video-on-Demand application, in particular in a local network, especially a WLAN. Embodiments can be used specifically in mesh networks.

The first key can therefore be a PMK-R0 key.

Figure 2:
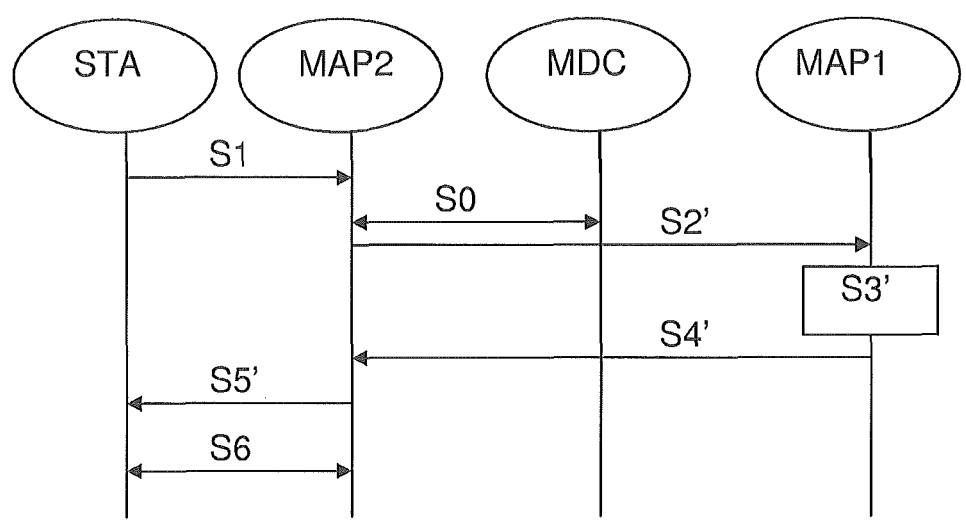
FIG. 2 schematically illustrates a communication in a handover procedure according to the IEEE 802.11r standard.

Using the node according to the invention eliminates the communication designated as S0 in FIG. 2 and its related handover procedure delays.

The key distributor node can be an authentication server, for example.

If there is an authentication server, it can be used to store the PMK-R0 key. In that case, the PMK-R0 key holder would then be the authentication server, and no longer an initial access node. The advantage of this is that the Mobility Domain Controller MDC shown in FIG. 2, used to establish a security relationship with the PMK-R0 key holder of a terminal, is no longer needed, and the entire communication between a new access node and the Mobility Domain Controller MDC can be eliminated. This reduces handover procedure delay.

If there is already an authentication server in the network, it can be expanded so that the Mobility Domain Controller MDC shown in FIG. 2 is not needed. In that case, as described in the IEEE 802.11r standard, the initial access node is no longer used as the PMK-R0 key holder, and the authentication server is used instead. This has the advantage of eliminating step S0 in the query for a PMK-R1 key as illustrated in FIG. 2: establishing a security relationship with the PMK-R0 key holder. Since, in this solution, the authentication server is the PMK-R0 key holder for all stations and every access node already has a security relationship with the authentication server, it is not necessary to establish a security relationship with the initial access node in order to join the network. This eliminates the entire communication with the Mobility Domain Controller MDC, meaning that both the delay and the use of bandwidth for a handover are reduced.

In one embodiment of the invention, the key distributor node is a node of the mesh network.

In this embodiment, it is not necessary for all PMK-R0 keys to be consigned to a central authority, so that the entire network is not affected if there is a problem in one area. Instead, PMK-R0 keys can advantageously be consigned to multiple central authorities with replication.

Most of all, in small mesh networks, it is advantageous to eliminate the need for hardware resources such as an authentication server and instead use a designated node for key distribution. Proprietary solutions that provide for initial authentication by means of technical features such as the MAC address of a terminal or by physically installing a root key, using USE sticks, for example, can therefore be implemented.

Also, in larger mesh networks with authentication servers, such designated nodes can be used, for example, in such a way that a central node plays the role of "authenticator" for each authentication. In such cases, in which there are additional designated nodes in the network with which each node is connected, expansion is possible such that each designated node plays the role of PMK-R0 key holder, instead of having an authentication server.

The first and second keys are preferably symmetrical key pairs, also called PMK.

The invention also concerns the combination of at least one key distributor node according to the invention and the aforementioned first and second access nodes.

In a preferred embodiment of the combination according to the invention, the first and second access nodes are nodes in a mesh network.

The combination according to the invention can form a mesh network with the terminal or multiple terminals.

One method of authenticating the terminal during a handover procedure in the mesh network according to the invention comprises the following sequential steps:

The mesh network terminal receives an authentication query through the second access node of the combination according to the invention, The second key is requested at the key distributor node through the second access node, Functions d) and e) of the invention's key distributor node are performed, The second key is transmitted through the key distributor node's data communication device to the second access node, An authentication response is transmitted through the second access node to the terminal, The terminal is connected with the second access node.

According to one embodiment of the invention, the preceding steps S1-S6 are performed if the terminal is located in a wireless cell overlap area of the first and second access nodes.

It is possible to configure the nodes with a storage device, wherein an initial authentication of the first and/or second access node is preferably performed before step S1 at the key distributor node, specifically by storing the first key in the storage device.

The invention also includes a computer program with features corresponding to a method according to the invention.

The invention can be used in a real-time network application such as a Voice-over-IP application or a Video-on-Demand application and/or in a local network, especially a WLAN.

Figure 1:
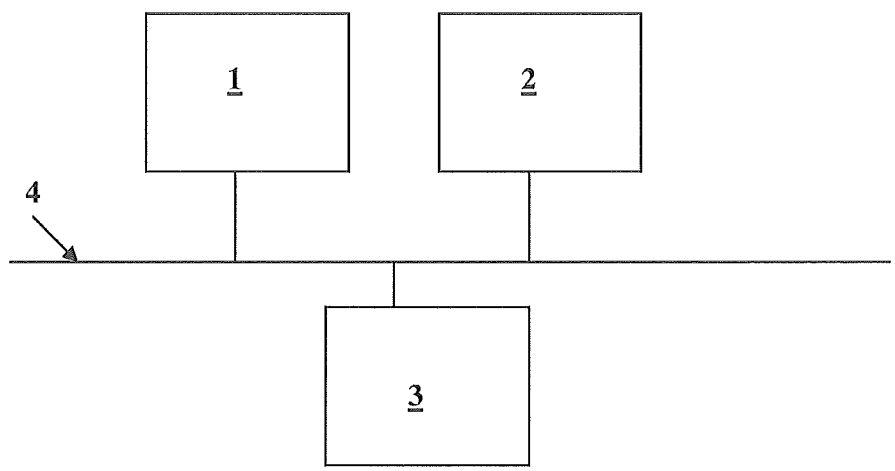
FIG. 1 schematically illustrates a key distributor node.

In the invention's key distributor node shown in FIG. 1, a processor 3 is connected to a memory device 1 and a data communication device 2 via a BUS 4.

Figure 3:
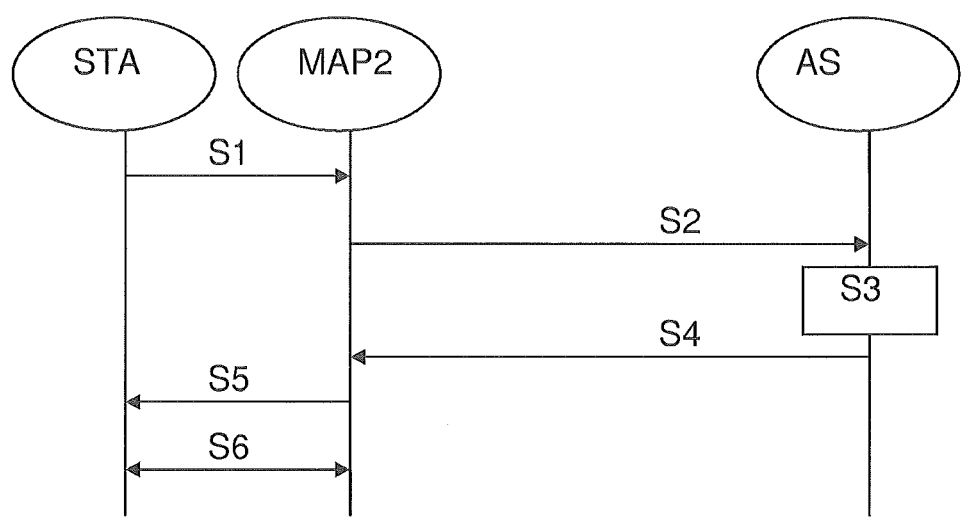
FIG. 3 schematically illustrates a communication in a handover procedure according to the invention.
Figure 4:
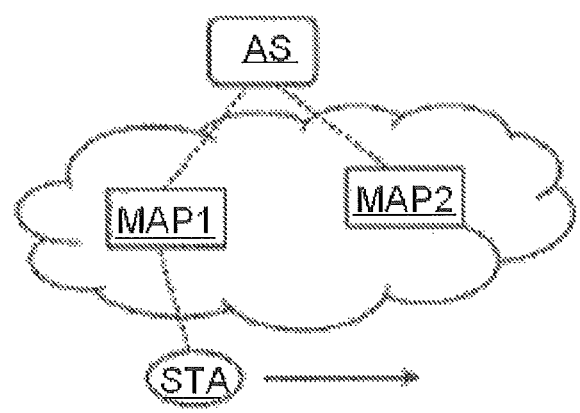
FIG. 4 illustrates a network according to the invention.

This key distributor node is used in a network illustrated in FIG. 4 as the authentication server and is connected to first and second access nodes MAP1, MAP2 via the data communication device 2. The network has the key distribution and handover functions described below with respect to FIGS. 3 and 4.

FIG. 3 illustrates the process of a handover to the aforementioned new access node MAP2. The PMK-R1 key is requested directly at the authentication server AS, and the handover procedure can then be successfully completed. The authentication server AS is accessible only to privileged users and is therefore well protected.

The network shown in FIG. 4 comprises two meshable access nodes, only one of which, MAP2, is illustrated in FIG. 3 and both of which were already authenticated via the authentication server AS when admitted to the mesh network, so that there is a security relationship with them. A mobile terminal STA in the form of a notebook computer is authenticated via the access node MAP2, which forwards the authentication information to the authentication server AS. The authentication server AS verifies the access authorization and generates a master key upon successful authentication of the access node. From that master key, it derives the PMK-R0 key, which it stores in its function as the local PMK-R0 key holder. In the state of the art according to the IEEE 802.11r standard, the initial access node fulfills the function of the PMK-R0 key holder for the station. In relation to the storage of the PMK-R0 key, the authentication server AS generates a PMK-R1 key and transmits it back to the requesting access node MAP2. This PMK-R1 key contains certain information about the access node MAP2, such as its MAC address, and thus forms the basis for protecting the communication relationship between the access node MAP2 and the terminal STA which is now associated with the mesh network via the access node MAP2.

In the network topology shown in FIG. 4, the terminal is associated with the access node MAP1 and moves in the direction of the arrow shown in FIG. 4 in a wireless cell of the access node MAP2. At a specific point in time, the terminal initiates a related handover procedure from access node MAP1 to access node MAP2. The optimum time for such a handover is assumed here to be preset. After initiating the handover procedure, MAP2 must request a PMK-R1 key from the terminal's PMK-R0 key holder through the station STA, in order to be able to establish a security relationship with the terminal. To do this, a security relationship is first required between the PMK-R0 key holder and the new access node MAP2. In the original standard, the new access node MAP2 had to request such a security relationship with the initial access node MAP1 from the Mobility Domain Controller MDC. MAP1 could not transmit a PMK-R1 key to MAP2 until that connection was made. The proposed invented solution shortens the communication by one "cycle length," because with this solution the authentication server AS performs the function of the PMK-R0 key holder. The new access node MAP2 thus requests the PMK-R1 key required for the handover from the authentication server AS, with which it already has a security relationship. The query illustrated in FIG. 2 for a security relationship with the MDC is therefore omitted. In response to the query from MAP2, the authentication server AS transmits a MAP2-specific PMK-R1 key to the new access node MAP2, which is used as the basis for protecting the communication relationship between MAP2 and the terminal STA, making it possible to complete the handover procedure.

The authentication comprises the following sequential steps:

The network terminal STA receives an authentication query through the second access node MAP2 of the combination according to the invention, The second key PMK-R1 is requested at the server AS through the second access node MAP2, To authenticate the terminal (STA) at the second access node MAP2, the second key is derived from the first key, The second key PMK-R1 is sent to the second access node MAP2, An authentication response is transmitted through the second access node MAP2 to the terminal STA, The terminal STA is associated with the second access node MAP2.

Special Advantages of Invention Embodiments

If there is an authentication server, there is no need for communication with the Mobility Domain Controller to establish a security relationship with the PMK-R0 key holder of a station, since the authentication server, which has already set up a security relationship with all access nodes, handles the management and storage of the PMK-R0 key. Such a feature prevents delays caused by requesting the PMK-R1 key required for a handover procedure. Thus, it is possible to further speed up a handover procedure in mesh networks, and real-time applications such as Voice-over-IP can be better supported.

The invention claimed is:

1. A key distributor node, comprising:
a memory device with at least one first key, said first key derived from a master key for building a secure relationship;
at least one data communication device configured to exchange data with first and second access nodes integrated into a network in which the key distributor node is connected, wherein the first key is derived from the master key during establishment of a security relationship between the second access node and the key distributor node,
at least one processor connected to the memory device and the data communication device,
wherein functions are provided for the at least one processor to complete a handover of a terminal from the first access node to the second access node by responding to a received key request from the terminal via the second access node using the established security relationship with the key distributor node by:
deriving a second key from the first key in response to the key request at the key distributor node, and
transmitting the derived second key to the second access node via the data communication device and forwarding the second key to the terminal to establish a secure relationship for communications between the terminal and the second access node in order to complete the handover without the second access node forming a secure relationship with the first access node.

2. The key distributor node of claim 1, wherein the key distributor node is an authentication server.

3. The key distributor node of claim 1, wherein the key distributor node is a node on a mesh network.

4. The key distributor node of claim 1, wherein the second key encodes proprietary features of the terminal.

5. The key distributor node of claim 1, wherein the first and second keys are symmetric key pairs.

6. The key distributor node of claim 1, wherein the network facilitates at least one member of the group consisting of a voice-over-IP application and a video-on-demand application.

7. A combination comprising the key distributor node of claim 1, the first access node and the second access node.

8. The combination of claim 7, wherein the first access node and the second access node are nodes on a mesh network.

9. A network comprising the key distributor node of claim 1, the first access node, the second access node, and the terminal.

10. The network of claim 9, wherein said network is a mesh network.

11. The network of claim 10, wherein the mesh network is a local network.

12. A method for authenticating a terminal during a handover procedure in a network comprising:
a key distributor node authenticating a first access node of a network to form a security relationship between the first access node and the key distributor node;
the key distributor node authenticating a second access node of the network to form a security relationship between the second access node and the key distributor node;
in response to a request for a second key that the key distributor node receives from the second access node for forming a security relationship between the second access node and a communication terminal that has moved away from a wireless cell of the first access node toward a wireless cell of the second access node, the key distributor node generating the second key by deriving that second key from a first key saved in a storage device accessible by the key distributor node and subsequently sending the derived second key to the second access node, the first key being a pre-existing key that was previously saved by the key distributor node when forming the security relationship between the second access node and the key distributor node prior to the key distributor node receiving the request for the second key from the second access node.

13. The method of claim 12, wherein the first key is a PMK-R1 key.

14. The method of claim 13, wherein the second key is a PMK-R0 key that is generated based on the authenticating of the second access node.

15. The method of claim 12, wherein the key distributor node is an authentication server.

16. The method of claim 12, wherein the handover procedure is performed such that no communication with a mobility domain controller is involved to effect the handover.

17. A non-transitory computer-readable storage media comprising instructions that are executable by a key distributor node that, when implemented, result in the key distributor node performing a method comprising:
the key distributor node authenticating a first access node of a network to form a security relationship between the first access node and the key distributor node;
the key distributor node authenticating a second access node of the network to form a security relationship between the second access node and the key distributor node;
the key distributor node responding to a request for a first key from the second access node for use in forming a security relationship between the second access node and a communication terminal that is received after the first and second access nodes were authenticated by the key distributor node by generating the first key by deriving that first key from a second key saved in a storage device accessible by the key distributor node that was formed during the authenticating of the second access node of the network to form the security relationship between the second access node and the key distributor node and subsequently sending the derived first key to the second access node, wherein the generated first key derived from the second key that is sent to the second access node is usable for facilitating a handover for associating the communication terminal with the second access node without an establishment of a secure relationship between the first access node and the second access node for performing the handover.

18. The non-transitory computer-readable storage media of claim 17, wherein the method is defined such that the handover procedure is performed without communication with a mobility domain controller being involved to effect the handover.

19. The non-transitory computer-readable storage media of claim 18, wherein the first key is a PMK-R1 key and the second key is a PMK-R0 key that is generated based on the authenticating of the second access node.

20. The non-transitory computer-readable storage media of claim 19, wherein the second key is a pre-existing key that was previously saved by the key distributor node when authenticating the second access node prior to the key distributor node receiving the request for the first key from the second access node; and wherein the key distributor node is an authentication server or is a node of a mesh network.

* * * * *